(12) United States Patent
Huang et al.

(10) Patent No.: US 7,543,646 B2
(45) Date of Patent: *Jun. 9, 2009

(54) SUSPENSION OF CONCENTRATED PARTICULATE ADDITIVES CONTAINING OIL FOR FRACTURING AND OTHER FLUIDS

(75) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/122,843

(22) Filed: May 19, 2008

(65) Prior Publication Data

US 2008/0220995 A1    Sep. 11, 2008

Related U.S. Application Data

(63) Continuation-in-part of application No. 11/830,299, filed on Jul. 30, 2007.

(60) Provisional application No. 60/834,513, filed on Jul. 31, 2006.

(51) Int. Cl.
*E21B 43/00* (2006.01)
*E21B 43/16* (2006.01)
*E21B 43/26* (2006.01)

(52) U.S. Cl. ............... 166/305.1; 166/300; 166/308.2; 166/279

(58) Field of Classification Search ............ None
See application file for complete search history.

(56) References Cited

U.S. PATENT DOCUMENTS

| 4,834,957 | A | 5/1989 | Van de Walle |
| 5,259,455 | A | 11/1993 | Nimerick et al. |
| 6,703,352 | B2 | 3/2004 | Dahayanake et al. |
| 6,908,886 | B2 | 6/2005 | Jones et al. |
| 7,268,100 | B2 | 9/2007 | Kippie et al. |
| 7,343,972 | B2 | 3/2008 | Willingham et al. |
| 2005/0176591 | A1* | 8/2005 | Jones et al. ............ 507/214 |
| 2006/0194700 | A1 | 8/2006 | Gatlin et al. |
| 2007/0151726 | A1 | 7/2007 | Crews et al. |
| 2007/0298978 | A1 | 12/2007 | Crews et al. |
| 2008/0023201 | A1 | 1/2008 | Huang et al. |
| 2008/0035340 | A1 | 2/2008 | Welton et al. |
| 2008/0060812 | A1 | 3/2008 | Huang et al. |
| 2008/0202744 | A1* | 8/2008 | Crews et al. ............ 166/246 |

OTHER PUBLICATIONS

E. Ali, et al., "Effective Gas Shutoff Treatments in a Fractured Carbonate Field in Oman," SPE Annual Technical Conference, Sep. 24-27, 2006, pp. 1-12, SPE 102244, San Antonio, Texas.
J. B. Crews, et al., "New Fluid Technology Improves Performance and Provides a Method to Treat High-Pressure and Deepwater Wells," 2006 SPE Annual Technical Conference and Exhibition, SPE 103118, Sep. 24-27, 2006, San Antonio, Texas, pp. 1-10.

* cited by examiner

*Primary Examiner*—Zakiya W Bates
*Assistant Examiner*—Angela M DiTrani
(74) *Attorney, Agent, or Firm*—Mossman, Kumar & Tyler, PC

(57) ABSTRACT

The handling, transport and delivery of particulate materials, particularly fine particles, may be difficult. Alkaline earth metal oxide particles such as magnesium oxide (MgO) may be suspended in glycerin and/or alkylene glycols such as propylene glycol up to loadings of 51 wt %. Such suspensions or slurries make it easier to deliver MgO and similar agents into fluids, such as aqueous fluids gelled with viscoelastic surfactants (VES). These concentrated suspensions or slurries may be improved in their stability by the inclusion of minor amounts of a vegetable oil and/or a fish oil. The MgO serves as stabilizers and/or fluid loss control agents for VES-gelled fluids used to treat subterranean formations, e.g. for well completion or stimulation in hydrocarbon recovery operations. The particle size of the magnesium oxide or other agent may be between 1 nanometer to 0.4 millimeter.

11 Claims, No Drawings

SUSPENSION OF CONCENTRATED PARTICULATE ADDITIVES CONTAINING OIL FOR FRACTURING AND OTHER FLUIDS

CROSS-REFERENCE TO RELATED APPLICATIONS

This application is a continuation-in-part application of U.S. Ser. No. 11/830,299 filed Jul. 30, 2007, which claims the benefit of U.S. Provisional Patent Application 60/834,513 filed Jul. 31, 2006.

TECHNICAL FIELD

The present invention relates to suspensions and slurries of particles, and more particularly relates, in one embodiment, to methods and compositions for suspending fine particles in non-aqueous fluids to facilitate the handling of the particles.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations and the conductivity of propped fractures.

Aqueous fluids gelled with viscoelastic surfactants (VESs) are also known in the art. VES-gelled fluids have been widely used as gravel-packing, fracpacking and fracturing fluids because they exhibit excellent rheological properties and are less damaging to producing formations than crosslinked polymer fluids. VES fluids are also used as acid diverting, water and/or gas control fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to use fluid loss agents for VES fracturing treatments in high permeability formations.

Additives for aqueous drilling fluids, including fracturing fluids, which are fine particulates may be difficult to handle, transport and introduce into the fluids. The particulates may also cause dust problems. It would be desirable if a method and/or composition would be devised to make the handling, transportation and introduction of these particulate additives easier.

SUMMARY

There is provided, in one form, concentrated slurry of particles that includes particles having an average particle size of about 400 microns or less, where the particles are alkaline earth metal oxides, alkaline earth metal hydroxyides, transition metal oxides, and/or transition metal hydroxides. The slurry has the particles suspended in a non-aqueous fluid that may be alkylene glycols and/or glycerin. The slurry also contains at least one vegetable oil and/or fish oil in an amount effective to improve the suspension of the particles in the non-aqueous fluid.

There is further provided in another non-limiting embodiment a method for treating a subterranean formation with an aqueous viscoelastic treating fluid that involves introducing an aqueous treating fluid through a wellbore to the subterranean formation. The aqueous treating fluid includes an aqueous base fluid, a viscoelastic surfactant (VES) gelling agent in an amount that increases the viscosity of the aqueous base fluid, and a fluid loss control agent slurry. The fluid loss control agent slurry includes a non-aqueous fluid that may be alkylene glycols and/or glycerin, and suspended therein at least one fluid loss control agent that may include alkaline earth metal oxides, alkaline earth metal hydroxides, transition metal oxides, and/or transition metal hydroxides. The fluid loss control agent slurry also contains at least one vegetable oil and/or fish oil in an amount effective to improve suspension of the fluid loss control agent in the non-aqueous fluid. The fluid loss control agent slurry may be added to the aqueous treating fluid before, during or after introducing the aqueous treating fluid through the wellbore.

Also provided in one non-restrictive form is an aqueous viscoelastic treating fluid that includes an aqueous base fluid, a viscoelastic surfactant (VES) gelling agent in an amount effective to increase the viscosity of the aqueous base fluid, and a concentrated slurry of particles. The VES gelling agent may be added to the aqueous base fluid to form an aqueous treating fluid. The concentrated slurry of particles may then be added to the aqueous treating fluid. The concentrated slurry of particles includes particles having an average particle size of about 400 microns or less, which may be alkaline earth metal oxides, alkaline earth metal hydroxides, transition metal oxides, and/or transition metal hydroxides suspended in a non-aqueous fluid of alkylene glycols and/or glycerin. The concentrated particle slurry also includes at least one vegetable oil and/or fish oil in an amount effective to improve the suspension of the particles in the non-aqueous fluid.

The fluid loss control agents (e.g. MgO and/or $Mg(OH)_2$, and the like) appear to help develop a pseudo-filter cake of VES micelles by associating with them as well as ions and particles to produce a novel and unusual viscous fluid layer of pseudo-crosslinked elongated micelles on the reservoir face that limits further VES fluid leak-off. It has been discovered that nanometer-sized fluid loss control agents may be used to form a similar viscous fluid layer of pseudo-crosslinked micelles on the formation face that are equivalent to micron-sized fluid loss control agents herein for controlling rate of VES fluid loss, yet can be non-pore plugging and physically easier to produce back with the VES fluid after a VES treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

The addition of alkaline earth metal oxides, such as magnesium oxide, and alkaline earth metal hydroxides, such as calcium hydroxide, to an aqueous fluid gelled with a VES may increase the viscosity of the fluid, may help stabilize the fluid, and may prevent or inhibit the precipitation of solids in these brines. In particular, the VES-gelled aqueous fluids containing these agents may be more stable at high temperatures, such as at 200° F. (93° C.) or higher. This discovery allows the VES system to be used at a higher temperature, and helps minimize formation damage after hydraulic fracturing operations. The introduction of these additives to the VES systems could also possibly lower the amount of VES surfactant needed to obtain the fluid viscosity necessary to perform VES applications or treatments, particularly since less of the VES is lost due to fluid loss or precipitation.

DETAILED DESCRIPTION

It has been discovered that alkaline earth metal oxides, alkaline earth metal hydroxides, transition metal oxides, transition metal hydroxides, and mixtures thereof, and in particular magnesium oxide may serve to inhibit or prevent fluid loss in aqueous fluids gelled with VESs, as described in U.S. Patent Application Publication No. 2008/0060812 A1, incorporated herein in its entirety by reference. Some of these same materials may also be effective as system stabilizers and performance enhancers for aqueous fluids gelled with VESs, as described in U.S. Pat. No. 7,343,972, also incorporated herein in its entirety by reference. These magnesium oxide particles and powders and the like have been used as stabilizers for VES-gelled aqueous fluids at temperatures from about 180 to about 300° F. (about 82 to about 149° C.). The size of these MgO particles typically ranges from several nanometers to 400 microns in diameter.

However, these additives are available only in solid or particulate form, and it is sometimes difficult to handle, transport and introduce these particulates in field applications. In particular, the dry, solid particulates present a dust problem. Particles this small, which are on the order of powder size (colloidal sizes and smaller) are hard to handle in field applications. In most industrial applications, such as in hydrocarbon drilling and recovery operations, it is beneficial and customary to transport materials by pumps through pipes, tubulars and other conduits. Powders and particulates per se cannot be handled by this customary equipment. There is thus a need to provide these MgO particles in a liquid form. Magnesium oxide powder has a very high reactivity index and easily absorbs water; indeed MgO reacts facilely with water to form magnesium hydroxide ($Mg(OH)_2$). Consequently, water is not a suitable carrier for these materials.

It was discovered that the MgO particles could be provided in the form of a concentrated suspension slurry using an alkylene glycol and/or glycerin as a carrier fluid for the particles. The concentrated suspension slurry is easy to pump to mix with other fluids such as VES-gelled aqueous fluids for hydraulic fracturing. As described in the parent application Ser. No. 11/755,581, published as U.S. Patent Application Publication No. 2008/0060812 A1, incorporated herein by reference in its entirety, laboratory testing shows that magnesium oxide suspensions may comprise at least 37 weight % of magnesium oxide (the equivalent of about 5 pound per gallon loading (0.6 kg/liter), based on the combined weight of the propylene glycol and MgO. Viscosity testing and fluid loss tests at 250° F. (121° C.) show that the MgO slurry added into the VES-gelled aqueous fluid can maintain the fluid viscosity and fluid loss control properties, as compared with systems where the MgO is added as a dry, solid particulate or powder.

It has been further discovered that these concentrated suspensions of fluid loss control agents are improved by adding up to 15% by volume (bv) vegetable oil, such as when monopropylene glycol is the non-aqueous fluid of the slurry. Mixing vegetable oil with monopropylene glycol at high speed generates a microemulsion and/or emulsion that improves suspension of high concentrated particulate additives, such as magnesium oxide particles that have been used as stabilizers in VES-gelled fluids (U.S. Pat. No. 7,343,972) and as fluid loss control agents for VES-gelled fluids (U.S. Patent Application Publication No. 2008/0060812 A1). Generally, no surfactant is necessary to form these emulsions and/or microemulsions, but in one non-limiting embodiment, optionally, a very low concentration (less than 0.5 volume %) of surfactant may be included to form an emulsion or microemulsion, particularly to improve stability.

Fluid loss control agents of MgO particles have been developed by Baker Oil Tools for VES-gelled fluid systems and termed FLC-40 fluid loss control agents. The FLC-40 material includes very small particles of magnesium oxide ($D_{50}$ is 1.0 micron; $D_{90}$ is 5.5 microns, and specific surface area is about 160 m$^2$/g). The term "$D_{50}$" refers to 50% of the particles being smaller than 1.0 microns; likewise $D_{90}$ refers to 90% of the particles being smaller than 5.5 microns.

It is very hard to handle these small particles in field pumping. Additionally, the dust generated may be a problem. As noted, water is an unsuitable carrier for MgO, thus it was found that propylene glycol was discovered to be a suitable carrier fluid. Propylene glycol is miscible in the water which is the basis for aqueous VES-gelled fluids. The concentrated suspension of the MgO powder comprises at least 19 wt % MgO (2 lb/gal; 0.24 kg/liter), based on the combined weight of the propylene glycol and magnesium oxide, and may range up to about 51 wt % (9 lb/gal; 1.1 kg/liter).

The solid particulates and powders useful herein include, but are not necessarily limited to, slowly water-soluble alkaline earth metal oxides or alkaline earth metal hydroxides, transition metal oxides, transition metal hydroxides, or mixtures thereof. In one non-limiting embodiment, the alkaline earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the transition metals such as copper, tin, nickel, and the like may be used in relatively low concentration compared to or in combination with the alkaline earth metals. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In one non-restrictive version, the loading of the carrier fluid may range up to about 37 wt %, alternatively up to about 41 wt %, and even as high as about 51 wt %. Alternatively, and independently, the lower end of the particle loading range may be about 5 wt %, in one non-limiting embodiment about 10 wt %, alternatively about 30 wt %.

In another non-limiting embodiment, the particle size of the additives and agents ranges between about 1 nanometer independently up to about 0.4 millimeter, alternatively up to 0.2 millimeter or even up to 0.1 millimeter. In another non-limiting embodiment, the particle size ranges between about 4 nanometers independently up to about 74 microns. It turns out that the particle size distribution of magnesium oxide is probably not a major factor for fluid loss control in VES-gelled fluids. In another non-restrictive version the fluid loss control agents may have a surface area of between about 10 to about 700 square meters per gram ($m^2/g$). In another non-restrictive version herein, the particles have an average particle size of about 400 microns in diameter or less, and alternatively about 200 microns in diameter or less.

Suitable non-aqueous carrier fluids for the slurries and suspensions herein include, but are not necessarily limited to alkylene glycols, glycerin, and mixtures thereof. In one non-limiting embodiment, alkylene glycols are defined herein as glycols with the structure $HO(CH_2)_xOH$ where x ranges from 2 to 8, alternatively from 2 to 6, and in another non-limiting embodiment from 2 to 4 where the alkylene group may be straight or branched. More specifically, suitable glycols include, but are not necessarily limited to propylene glycol, ethylene glycol and the like. In one non-limiting embodiment, propylene glycol is preferred over ethylene glycol. Mono-propylene glycol degrades into lactic acid, which is more environmentally friendly as compared with ethylene glycol that degrades into oxalic acid.

As noted, it has been discovered that the use of up to 15% bv vegetable oil helps improve the stability of these concentrated slurries. Suitable vegetable oils include, but are not limited to, canola oil, corn oil, peanut oil, olive oil, flaxseed oil, cottonseed oil, soybean oil, palm oil, safflower oil, sunflower oil, sesame oil, almond oil, and mixtures thereof. Other ranges of the vegetable oil in the slurry are from about 0.5% bv, independently up to about 15% bv, alternatively from about 3% bv, independently up to about 10% bv. Still further, up to 15% bv fish oil may be used in place of or in combination with a vegetable oil. Examples of fish oil include, but are not limited to, salmon oil, sardine oil, cod liver oil, tuna oil, herring oil, menhaden oil, mackerel oil, refined fish oils, and mixtures thereof.

In some cases, the stability of the emulsion and/or microemulsion may be further improved by additional use of polymers and/or surfactants. Polymeric material can be used to viscosify the glycol phase and surfactants can be used as emulsifiers at the interface, both to help stabilize the glycol-vegetable oil and/or fish oil microemulsion and/or emulsion. In one non-limiting embodiment, the emulsion and/or microemulsion includes macro- and/or micron-sized droplets of vegetable oil and/or fish oil within glycol, with the possibility that the MgO particles (or other fluid loss control agent) act as an emulsifying agent at the glycol-oil interface, although the inventors do not necessarily want to be limited to any particular explanation. Macro-sized droplets are defined herein as larger than micron-sized droplets.

The suspensions and slurries herein may be easily created by mixing the components. In lab, 500 ml slurry was mixed at 200 rpm in Warring blender for 20 minutes, in one non-limiting embodiment. For a low speed mixer, a longer time may be needed. As noted, it has been found that in some cases and under some conditions vegetable oils may also serve as beneficial suspension aids. At regular storage conditions, the shelf life of the slurries and suspensions herein may be about 12 months or longer.

The slurries or suspensions herein may be added along with the VES fluids prior to pumping downhole or other application. The VES-gelled aqueous fluids are prepared by blending or mixing a VES into an aqueous fluid. The aqueous base fluid could be, for example, water, brine, aqueous-based foams or water alcohol mixtures. The brine base fluid may be any brine, conventional or to be developed which serves as a suitable media for the various concentrate components. As a matter of convenience, in many cases the brine base fluid may be the brine available at the site used in the completion fluid or other application, for a non-limiting example.

More specifically, and in non-limiting embodiments, the brines may be prepared using salts including, but not necessarily limited to, NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

The viscoelastic surfactants suitable useful herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^{31}$ may have the following structure (I):

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One useful VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives described herein may also be used in Diamond FRAQ™ which is a VES system, similar to SurFRAQ, which contains VES breakers sold by Baker Oil Tools.

The amount of VES included in the fracturing fluid depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the present methods and compositions is from about 1.0 to about 6.0% by volume VES product. In an alternate, non-restrictive embodiment, the amount of VES ranges from 2 to about 10 volume %.

In application, the concentrated slurry of MgO (or other particulate) containing the relatively small proportion vegetable oil for stabilization improvement may be diluted or mixed with the VES-gelled fluids at the surface before they are pumped downhole. The temperature range for the concentrated slurry itself may be from about −30 to about 150° F. (about −34 to about 66° C.) as storage and field temperatures. When the slurry is mixed with the VES-gelled fluids, the application or use temperature may range from about 70 to about 400° F. (about 21 to about 204° C.), alternatively up to about 300° F. (about 149° C.).

In hydraulic fracturing applications, propping agents are typically added to the base fluid after the addition of the VES. Propping agents include, but are not limited to, for instance, quartz sand grains, glass and ceramic beads, sized calcium carbonate and other sized salts, bauxite grains (e.g. sintered bauxite), walnut shell fragments, aluminum pellets, nylon pellets, and the like solid particulate matter suitable as a screen or proppant. The propping agents are normally used in concentrations between about 1 to 14 pounds per gallon (120-1700 kg/m$^3$) of fracturing fluid composition, but higher or lower concentrations can be used as the fracture design requires.

The base fluid can also contain other conventional additives common to the well service industry such as water wetting surfactants, non-emulsifiers and the like. In the methods and compositions herein, the base fluid can also contain additives which can contribute to breaking the gel (reducing the viscosity) of the VES fluid. Since the loading of this slurry in VES fluid is very small, usually less than 1% bv, any influence of the vegetable oil or fish oil in the slurry on VES fluid viscosity is not noticeable.

While the viscoelastic fluids are herein described most typically as having use in fracturing fluids, it is expected that they will find utility in completion fluids, gravel pack fluids, fluid loss pills, lost circulation pills, diverter fluids, foamed fluids, stimulation fluids, water and/or gas control fluids, enhanced oil recovery (i.e. tertiary recovery) fluids, and the like.

In another non-restrictive embodiment, the treatment fluid may contain other viscosifying agents, other different surfactants, clay stabilization additives, scale dissolvers, biopolymer degradation additives, and other common and/or optional components.

In a particularly useful embodiment herein, use with internal VES breakers can have synergistic clean-up effects for the fluid loss control agent and the VES fluid. Use of the compositions herein with an internal breaker may allow less VES fluid to leak-off into the reservoir, thus resulting in less fluid needing to be broken and removed once the treatment is over. Additionally, use of an internal breaker within the VES micelles may further enhance the breaking and removal of the pseudo-filter cake viscous VES layer that develops on the formation face with the fluid loss agents herein. Lab tests to date appear to show that the viscous VES pseudo-filter cake has the micelles readily broken down to the relatively non-viscous, more spherically-shaped micelles by use of an internal breaker, and also with use of an encapsulated breaker, if used.

The invention will be further described with respect to the following Examples which are not meant to limit the invention, but rather to further illustrate the various embodiments.

EXAMPLES

Laboratory tests show that using 5% bv and 10% bv canola oil mixed with monopropylene glycol as carrier fluids can suspend 23% by weight (bw) of magnesium oxide particles (4 pounds per gallon loading, particle size $D_{50}$=1 micron (about 0.5 kg/L)) without particulate settling on the bottom of containers after 48 hours. Under the same testing conditions, without canola oil being mixed with monopropylene glycol, some particle settling is seen on the bottoms of the containers after 48 hours. The microemulsion and/or emulsion generated by canola oil and monopropylene glycol will also increase the shelf life of this concentrated slurry product.

In the foregoing specification, the invention has been described with reference to specific embodiments thereof, and has been demonstrated as effective in improving the handling of certain particulates and powders, such as the delivery of particulate fluid loss agents to viscoelastic surfactant-gelled fluids. The introduction of the particulates in the form of a slurry avoids the dust problems of prior products.

However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of alkaline earth metal oxides and alkaline earth metal hydroxides, transition metal oxides and transition metal hydroxides, non-aqueous carrier fluids, vegetable oils as slurry stabilizers, brines, viscoelastic surfactants, and other components falling within the claimed parameters, but not specifically identified or tried in a particular composition, are anticipated to be within the scope of this invention. In another non-limiting embodiment, the compositions and methods herein may find utility in delivering MgO and similar materials in the fields of livestock feeding, fertilizer handling and pharmaceuticals.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for treating a subterranean formation with an aqueous viscoelastic treating fluid comprising introducing an aqueous treating fluid through a wellbore to the subterranean formation, where the aqueous treating fluid comprises:
   an aqueous base fluid;
   a viscoelastic surfactant (VES) gelling agent in an amount effective to increase the viscosity of the aqueous base fluid; and
   a fluid loss control agent slurry comprising:
      a non-aqueous fluid selected from the group consisting of alkylene glycols, glycerin and mixtures thereof,
      at least one fluid loss control agent selected from the group consisting of alkaline earth metal oxides, alkaline earth metal hydroxides, transition metal oxides, transition metal hydroxides, and mixtures thereof, and
      at least one oil selected from the group consisting of vegetable oil and fish oil, in an amount effective to improve suspension of the fluid loss control agent in the non-aqueous fluid.

2. The method of claim 1 where the fluid loss control agent is an alkaline earth metal oxide or hydroxide and the alkaline earth metal is selected from the group consisting of magnesium, calcium, strontium, barium and mixtures thereof.

3. The method of claim 1 where the fluid loss control agent is magnesium oxide particles having an average particle size of about 400 microns or less.

4. The method of claim 1 where the non-aqueous fluid is propylene glycol.

5. The method of claim 1 where the wt% of particles in the non-aqueous fluid ranges from about 5 to about 51 wt %.

6. The method of claim 1 where the aqueous base fluid is brine.

7. The method of claim 1 where the amount of the fluid loss control agent slurry ranges from about 2 to about 200 pptg (about 0.2 to about 24 kg/m$^3$) based on aqueous viscoelastic treating fluid.

8. The method of claim 1 where the oil is present in the fluid loss control agent slurry in an amount up to about 15% by volume.

9. A method for treating a subterranean formation with an aqueous viscoelastic treating fluid comprising introducing an aqueous treating fluid through a wellbore to the subterranean formation, where the aqueous treating fluid comprises:
   an aqueous base fluid;
   a viscoelastic surfactant (VES) gelling agent in an amount effective to increase the viscosity of the aqueous base fluid; and
   a fluid loss control agent slurry comprising:
      a non-aqueous fluid selected from the group consisting of alkylene glycols, glycerin and mixtures thereof,
      at least one fluid loss control agent selected from the group consisting of alkaline earth metal oxides, alkaline earth metal hydroxides, transition metal oxides, transition metal hydroxides, and mixtures thereof, where the fluid loss control agent has an average particle size of about 400 microns or less, and
      up to about 15% by volume of at least one oil selected from the group consisting of vegetable oil and fish oil, in an amount effective to improve suspension of the fluid loss control agent in the non-aqueous fluid, based on the fluid loss control agent slurry.

10. The method of claim 9 where the fluid loss control agent is an alkaline earth metal oxide or hydroxide and the alkaline earth metal is selected from the group consisting of magnesium, calcium, strontium, barium and mixtures thereof.

11. The method of claim 9 where the wt% of particles in the non-aqueous fluid ranges from about 5 to about 51 wt %.

* * * * *